Patented May 20, 1941

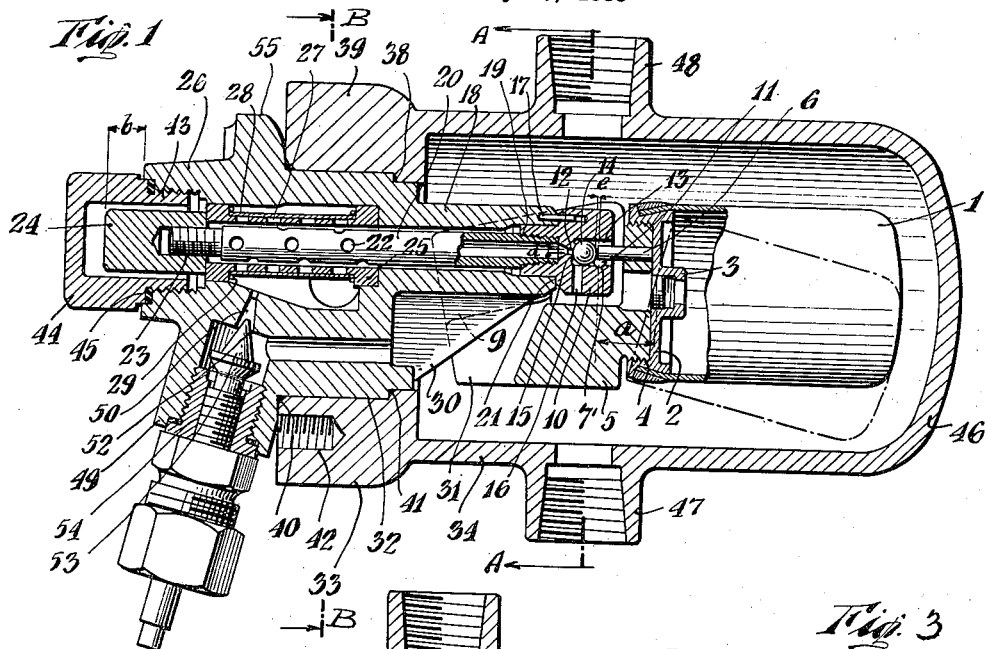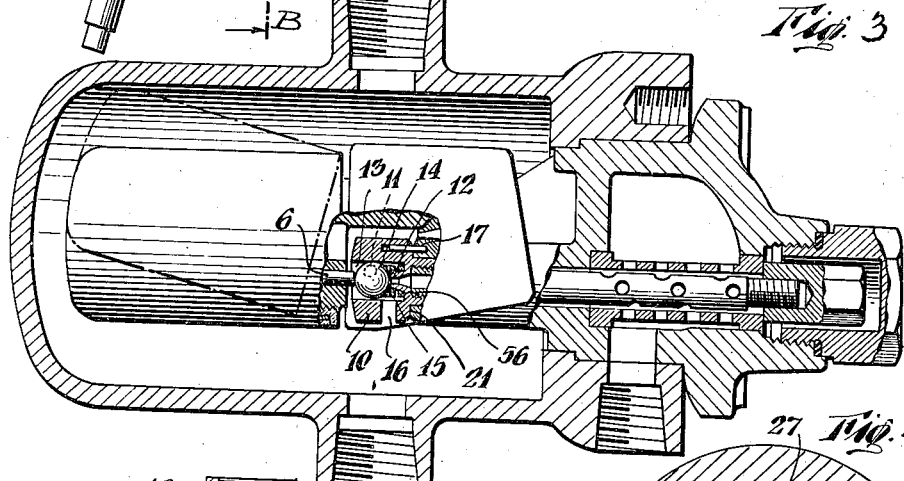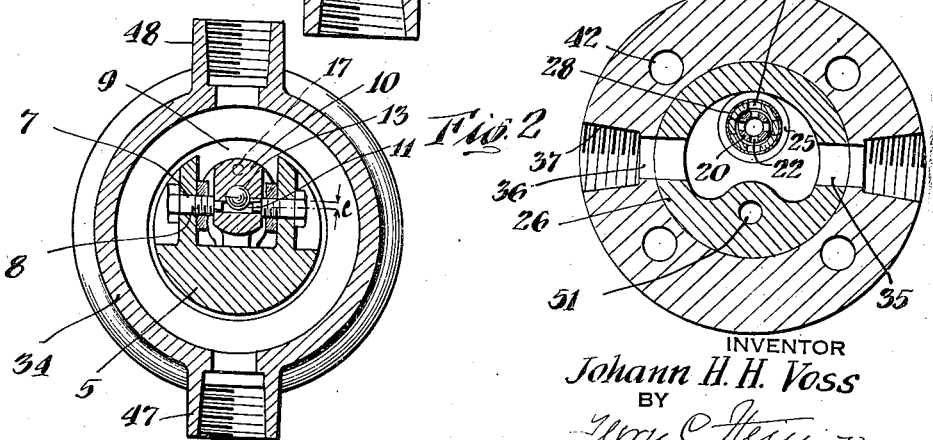

2,242,560

UNITED STATES PATENT OFFICE 2,242,560

FLOAT VALVE

Johann H. H. Voss, White Plains, N. Y.

Application May 24, 1939, Serial No. 275,337

5 Claims. (Cl. 137—104)

My invention relates to improvements in float valves, particularly to a float valve apt to reliably close against high pressure differences of many atmospheres and to withstand considerable pressure fluctuations on the low pressure side.

My float valve is particularly well adapted for apparatus using liquids which evaporate to a considerable volume of gas when expanded, as is for instance the case with refrigerating media. My valve is therefore especially well adapted to control the flow of the refrigerant in refrigerating systems during expansion from the condenser and receiver to the evaporator and accumulator or surge tank respectively.

My float valve shows the following advantages: It consists of very simple elements which can readily be made with the customary standard machine tools and from any desired suitable material for a given refrigerant, it has no parts subject to considerable wear and tear, and the entire construction is extraordinarily compact necessitating a small initial investment only and permits easy installation while entailing with the use of hot or cold liquids insignificant losses or absorption of heat only. The entire mechanism can easily be taken apart for inspection, cleaning or incidental repairs without the necessity of disconnecting any of the pipe lines which is particularly desirable when insulated pipe lines are used. Moreover substantially no oscillations are caused by my float valve as is the case with float valves with either too large or too small an inertia, as the jet of the discharged fluid in my valve counteracts such inertia and friction, and thus checks such oscillations to a considerable degree so as to prolong the life of the valve itself and to favorably affect the elements controlled by or connected with the valve. As is well known a constant surge or vibration-free regulation of the expansion in refrigerating systems has an essential and beneficial influence upon the operation of the condenser and evaporator and hence the compressor.

My invention also relates to a float valve in which all of the liquid on the high pressure side is transferred to the low pressure side which means that all the liquid refrigerant is stored or actually doing refrigerating work on the low pressure side.

These and other objects and advantages of my invention will become more fully known as the description thereof proceeds and will then be specifically defined in the appended claims.

In the accompanying drawing forming a material part of this disclosure:

Fig. 1 is a longitudinal section through a low pressure float valve constructed according to my invention.

Fig. 2 is a cross-section on line A—A of Figure 1.

Fig. 3 is a longitudinal section through a high pressure float valve constructed according to my invention.

Fig. 4 is a cross-section through the valve, Figure 1, on line B—B of this figure.

As illustrated in Figures 1, 2 and 4, the floating unit mainly consists of three parts, the float proper 1, the shield 2 and the counterweight 5. The float proper 1 is a hollow, essentially cylindrical body preferably seamless drawn or pressed, and having a relatively thin wall. On one end the float is provided with a convex bottom, and on the other end it is open. This open end is adapted to be closed by the shield 2, and float and shield may be welded or soldered tightly to one another. The shield 2 is essentially designed to form a flat disk which makes it easy to be machined with the usual machine tools irrespective of the material selected.

While this flat shape of the disk calls for a thicker wall than would be necessary for a shield having a curved bottom, and which might be considered to constitute a disadvantage, it will be found that the increase in weight is but of small significance as it acts on a small lever arm $a$ only and thereby contributes very little to the momentum about the fulcrum 1'. On the other hand this small disadvantage is more than compensated by the advantage of easy manufacture, and the easy, reliable and extraordinary compact assemblage of the various parts made possible by a shield so designed.

The shield may be provided with a nipple 3, used for the pressure test, and which is thereafter hermetically sealed.

The shield has a thread 4 by means of which it is fastened to the counterweight 5, and the valve stem or push rod 6 is affixed to the shield.

The cast counterweight 5 is provided with bores 7 serving to receive the bolts 8 on which the floating system is pivoted. The counterweight also has a recess 9 into which project the parts more fully to be described hereafter, and the recess is shaped to avoid contact of the counterweight 5 with these parts while the motion of the floating unit is limited by the contact of the float 1 with the housing as indicated by the dash and dot lines. On its circumference the counterweight is so shaped as to allow its removal through the opening in the head, irrespective of its position, and together with the other parts of the mechanism.

Within the above mentioned recess 9 is located the mouthpiece 10 forming one of the most important parts of the valve and made of more expensive material as for instance stainless steel and having a bore 11 serving as a bearing for the bolts 8. Rectangularly disposed to the bore 11 the mouth-piece is drilled to form a passage for the liquid to be controlled by the float. This liquid enters through a bore or orifice 12 which leads to a larger bore 13 into which fits the ball 14. This ball controls the opening 12 in the valve seat 15. Next to the valve seat 15 a hole or slot 16 is provided leading downwards through which the jet of expanded fluid and vapor is discharged and directed against the counterweight. The dowel pin 17 fitting into corresponding bores in the mouth-piece 10 and in the support 18, secures the mouth-piece in position.

The mouth-piece furthermore has on its front a thread 19 by means of which it is fastened to the rear end of the pipe 20, and a washer or suitably ground joint 21 tightens the mouth-piece against the support 18. The pipe stem 20 is perforated by several holes 22 in the side wall of its front portion through which the liquid enters, and this front portion is provided with a thread 23 upon which a cap nut 24 is screwed. The marginal shoulder of this nut rests against the front portion of the strainer pipe 25, the rear portion of which rests against a corresponding face of the chambered flange 26. When the nut 24 is tightened, the mouth-piece 10 and the support 18 are pressed tightly against each other at the ground joint 21 while simultaneously the strainer 25 is secured in its proper position. The strainer 25 is provided with holes 27 and is surrounded by a screen 28 held in its proper position by suitable means as for instance by the wire loop 29.

The chambered flange 26 carries the support 18 which houses the rear end of the pipe 20 and supports the mouth-piece 10. This support may be reinforced by the rib 30 in which case evidently a corresponding cavity 31 must be provided in the counterweight 5 for the reception of this rib.

The outer, cylindrical face 32 of the chambered flange fits into the head 33 of the housing 34, and a bore 35 in the side wall of the flange 26 leads to a bore 36 in the head 33 which is connected with the inlet conduit 37. The chambered flange 26 has also a shoulder 38 and a substantially square flange 39 oppositely disposed to correspondingly shaped faces in the head 33, and gaskets 40 and 41 tightened simultaneously with the studs within opening 42 serve to provide tight connections at this point in order to prevent the liquid entering through either one of the bores 35 and 36 from escaping into the outer atmosphere or from by-passing the valve and reaching immediately the interior of the housing. The chambered flange 26 is secured to the head 33 by means of studs in the openings 42 or the like. In order to lodge the parts 20, 24 and 25, the chambered flange 26 has a threaded opening 43 adapted to be closed by means of a cap nut 44 and a washer 45. Suitably the pipe stem 20 and the nut 24 are made long enough in order to allow the nut 24 to project for a distance $b$, so that it may be accessible by means of a plain wrench.

The housing 34 is tightly connected to the head piece 33 preferably welded thereto, and is made preferably seamless in one piece with its rear curved bottom 46. The housing has at its bottom a pipe nipple 47 serving as outlet for the liquid while an upper nipple 48 allows the discharge of the vapor developed therein.

In certain constructions a by-pass expansion valve may be combined with the float valve, and in such a case a suitable hub 49 is provided in the chambered flange 26 which is connected by means of bores 50 and 51 with the chamber of the flange 26 and the interior of the housing 34 respectively. This connection or passage can be opened or closed in the usual manner at the valve seat 52 by means of the valve cone 53 which is operated by means of the hand spindle 54. By opening the hand-controlled by-pass the liquid level may be raised either temporarily and exceptionally above the level for which the float valve is set, or the valve may be used to control larger quantities of liquid as warranted by its size. So for instance the by-pass may be set for the passage of about 50% of the expected maximum quantity of the liquid whereas the float will then regulate between 50 and 100%.

The top 55 of the chambered flange 26 is provided with an accurately machined plane face so adjusted relatively to the axes of 8 and 13 and the pin 17 as to allow an accurate leveling of the entire valve both ways for correct installation.

When the liquid level rises the float system turns counter-clockwise, and when reaching a predetermined level, the ball is pressed tightly against the valve seat and the liquid supply is shut off.

In operation, as the fulcrum is positioned very close to the common center of gravity of the oscillating parts of the float valve, so that the entire system is suspended nearly in equilibrium (when no liquid is present in the housing, the float is so balanced as to keep the valve just open), the entire amount of buoyancy of the float can be converted into useful shut-off work. The distance $c$ in Fig. 2 between fulcrum and axis of the valve is very small, and as by dividing the pivot into two separate bolts 8 open space is left in the center line, it is possible to bring this distance to any desired degree of smallness which means that the closing force exerted by the valve is the maximum force for a float of a selected size. The dimension $c$ is determined by the equation $$c \cdot \tan \beta = L = \frac{1}{4}d$$

wherein $L$ represents the lift of the valve, $d$ the diameter of the bore 12 and $\beta$ the angular deviation of the float between its lowermost position (when it touches the housing) and its uppermost position (when it closes the valve tightly).

Also the dimension $e$ in Fig. 1 can be reduced to any desired degree of smallness and $$e = \frac{1}{2} c \cdot \tan \beta = \frac{1}{2} L$$

being most suitable. Thus, the end of the stem 6 opposed to the valve seat moves almost exactly in the direction of the axle of the bore 13. An accurate operation of the valve is thus brought about although the stem 6 is fixedly secured to the floating system without any intermediary link, which would have to swing in relation to the floating system and its oscillations and to be guided slidably within the immovable mouth-piece, in the manner of the connecting rod and the cross-head of a crank gear respectively. This smallness of the dimension $e$ is made possible by the described peculiar design, i. e. the arrangement of the valve seat in a projecting part and within a recess of the floating system thereby bringing it within any desired small distance from the fulcrum.

All the movable parts can be removed from the housing 34, together with the chambered flange 26, by simply unscrewing the studs from the openings 42. Due to the peculiar shape of the float and assembly counterweight no jamming can occur, no matter in which position the float mechanism may be.

The strainer too, can easily be taken out for cleaning or replacement by removing the cap 44 and unscrewing the nut 24 so that no disconnection of the liquid inlet pipe will be necessary in either case.

During the operation, oscillations with respect to the equilibrium of the float mechanism are unavoidable. It is however essential that these oscillations are kept within certain limits so as to effectively prevent overflooding of the evaporator and carrying liquid to the compressor under any operating condition of the refrigerating system. Out of its closed position the valve will open only after the liquid level has sunk for a certain amount and then more liquid will be admitted to the housing than is evaporated on the evaporator side, however, the valve will be shut off again only when the liquid has risen beyond the level at which the opening begins, as a sufficient surplus of force must be available to overcome inertia and friction. By the described arrangement of the hole 16 however, the jet of liquid-vapor-mixture is discharged against the counterweight in such a direction that it tends to move the oscillating system towards the valve closing position. Thus, after the opening, the valve will come to a stand-still at a point ahead of the point of stopping which it would assume without the provision of the hole 16 and jet action therethrough. In other words the oscillation is checked considerably while the discharged jet is made available for the return action.

This action of the valve may thus be well compared with the action of a well-balanced governor of a steam engine.

In the form of my invention illustrated in Figure 3, a high pressure valve is used to transfer all of the liquid on the high pressure side onto the low pressure side so that all liquid refrigerant is stored or actually doing refrigerating work on the low pressure side. The steel ball 14 is placed against the orifice or mouth-piece 12 and in this position the spring pressure exerted by spring 56 is overcome by the weight of the float acting on the steel ball with the pin 6. As soon as enough liquid accumulates in the float valve housing, the float is raised to its highest position shown in dash and dot lines. When the float moves upward, the spring pressure exerts itself on the steel ball so that the mouth-piece opens and lets the liquid refrigerant in the housing pass through into the low pressure side. In this form the flange has been changed and the screen has been omitted in the passageway of the liquid from the high pressure side to the low pressure side.

Otherwise the construction is the same as described with respect to my invention as illustrated in Figures 1, 2 and 4 with the exception of the reversed position of the housing and the changes in the steel ball which is somewhat larger, and in the position of the mouth-piece or orifice and the pressure of spring 56.

The function of the high pressure valve is so that when the float with its counterweight is in the high pressure position as shown in the full line in the drawing, the high pressure valve is closed.

It will be understood that I have described and shown the preferred forms of my invention only as some examples of the many possible ways to practically construct the float valve, and that I may make such changes in its general arrangement and in the construction of its minor details as come within the scope of the appended claims without departure from the spirit of my invention and the principles involved.

Having thus described my invention, what I claim as new and desire to secure by Letters Patent is:

1. A float valve device for reducing oscillations of the float mechanism comprising a casing, an inlet for said casing having a valve seat, a valve for cooperation with said seat, a float for controlling said valve, a counterweight attached to said float, a port in said seat on the outlet side of said valve for directing the escaping fluid in the form of a jet against the counterweight in a direction tending to close the valve whereby the valve upon opening is brought to a standstill at a point in advance of the position it would assume were the jet action not available.

2. A float valve device for reducing oscillations of the float mechanism comprising a casing, an inlet for said casing having a valve seat, a valve for cooperation with said seat, a float for controlling said valve, said float being open at one end, a shield formed by a substantially flat disc tightly closing the open end of said float, a counterweight directly fastened to said shield and having a recess, the entire valve mechanism including the valve seat being located within the recess of said counterweight, a port in said seat on the outlet side of said valve for directing the escaping fluid in the form of a jet against the counterweight in a direction tending to close the valve whereby the valve upon opening is brought to a standstill at a point in advance of the position it would assume were the jet action not available.

3. A float valve device for reducing oscillations of the float mechanism comprising a casing, an inlet for said casing having a valve seat, a valve for cooperation with said seat, a float for controlling said valve, said float being open at one end, a shield or flat disc closing the opening of said float, a fulcrumed counterweight fixed on said shield and having a recess, a mouth-piece member protruding into the recess of said counterweight, said valve seat being located in said protruding member close to the fulcrum of said counterweight, a port in said protruding member on the outlet side of said valve for directing the escaping fluid in the form of a jet against the counterweight in a direction tending to close the valve whereby the valve upon opening is brought to a standstill at a point in advance of the position it would assume were the jet action not available.

4. In a float valve as described including a chambered flange with a projecting part bearing a mouth-piece, a strainer resting with one end against said chambered flange and secured at its other end by a nut screwed to a member connected to said mouth-piece and extending through said projecting part and said strainer, and a screw cap for closing one end of said chamber whereby said strainer may be removed while avoiding the necessity of removing said chambered flange.

5. In a float valve structure, a casing having an inlet port provided with a seat, a mouth-piece about said seat, a valve member within the mouth-piece reciprocable toward and from said seat, a float for controlling said valve, a counterweight fixed to said float, pivot means for said counterweight comprising two axially aligned threaded bolts mounted in bores in said counterweight and journalled in said mouth-piece adjacent to but on opposite sides of said valve member, the journaled ends of said bolts being spaced from each other a distance slightly greater than the diameter of said valve member.

JOHANN H. H. VOSS.